US006254484B1

(12) United States Patent
McCrea, Jr.

(10) Patent No.: US 6,254,484 B1
(45) **Date of Patent: *Jul. 3, 2001**

(54) SECURE MULTI-SITE PROGRESSIVE JACKPOT SYSTEM FOR LIVE CARD GAMES

(76) Inventor: Charles H. McCrea, Jr., 2816 La-Casita, Las Vegas, NV (US) 89120

( * ) Notice: Subject to any disclaimer, the term of this patent is extended or adjusted under 35 U.S.C. 154(b) by 0 days.

This patent is subject to a terminal disclaimer.

(21) Appl. No.: 09/551,378

(22) Filed: Apr. 18, 2000

Related U.S. Application Data

(63) Continuation of application No. 09/054,326, filed on Apr. 2, 1998, now Pat. No. 6,093,103, which is a continuation of application No. 08/795,992, filed on Feb. 5, 1997, now Pat. No. 5,735,525, which is a continuation of application No. 08/420,303, filed on Apr. 11, 1995, now Pat. No. 5,605,334.

(51) Int. Cl.[7] .................................................... A63F 13/00

(52) U.S. Cl. ................................ 463/27; 463/12; 463/42; 273/148 R; 273/309

(58) Field of Search ................................ 463/12, 13, 27, 463/42, 46, 47; 273/148 R, 149 R, 307, 309

(56) References Cited

U.S. PATENT DOCUMENTS

| | | |
|---|---|---|
| 5,078,405 | 1/1992 | Jones et al. . |
| 5,199,710 | 4/1993 | Lamle . |
| 5,356,145 | 10/1994 | Verschoor . |
| 5,364,104 | 11/1994 | Jones et al. . |
| 5,374,061 | 12/1994 | Albrecht . |
| 5,393,067 | 2/1995 | Paulsen et al. . |
| 5,431,399 | 7/1995 | Kelley . |
| 5,544,893 | 8/1996 | Jones et al. . |
| 5,605,334 | 2/1997 | McCrea, Jr. . |
| 5,722,893 | 3/1998 | Hill et al. . |
| 5,735,525 | 4/1998 | McCrea, Jr. . |
| 5,770,533 | 6/1998 | Franchi . |
| 5,779,546 | 7/1998 | Meissner et al. . |
| 5,932,139 | 8/1999 | Oshima et al. . |
| 5,941,769 | 8/1999 | Order . |

FOREIGN PATENT DOCUMENTS

| | | |
|---|---|---|
| 44 39 502 | 11/1994 | (DE) . |

OTHER PUBLICATIONS

Safe Jack—Viktor Mayer & Michael Order, Jan. 24, 1995.
John Scarne, Scarne's New Complete Guide to Gambling, 1986, Simon & Shuster pp. 328–388.
Safe Jack Patent Application Translation (English).

*Primary Examiner*—Valencia Martin-Wallace
*Assistant Examiner*—John M Hotaling, II
(74) *Attorney, Agent, or Firm*—Dorr, Carson, Sloan & Birney, P.C.

(57) ABSTRACT

A secure game table system, adapted for multiple sites under a central control, for monitoring each hand in a live card game. A common deck identity code is located on each card. A shuffler has a circuit for counting the cards from a previous hand which are inserted into the shuffler and which reads the common identity code. The game control verifies that no cards have been withdrawn from the hand by a player or that new cards have been substituted. A unique code also placed on each card is read as the card is dealt to indicate the value and the suit. The game control stores this information in a memory so that a history of each card dealt is recorded. Sensors are located near each of the player positions for sensing the presence of a game bet and a progressive bet. A card sensor located near each player position and the dealer position issues a signal for each card received. The game control receives these signals and correlates those player positions having placed a game and/or progressive bet with the received cards. The game control at each table has stored in memory the winning combinations necessary to win the progressive jackpots. Since the game control accurately stores the suit and value of each card received at a particular player position, the game control can automatically detect a winning progressive combination and issue an award signal for that player position.

13 Claims, 13 Drawing Sheets

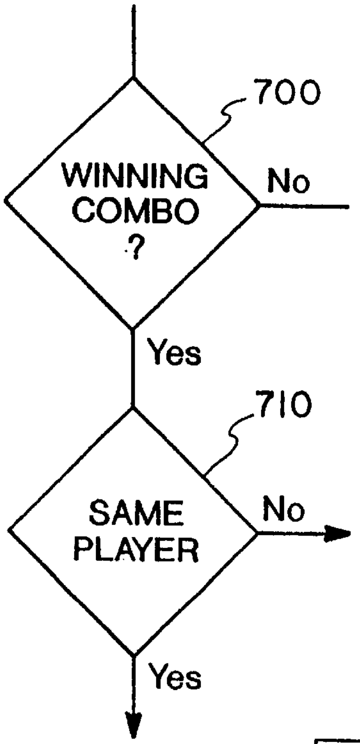
Fig. 7
Fig. 8
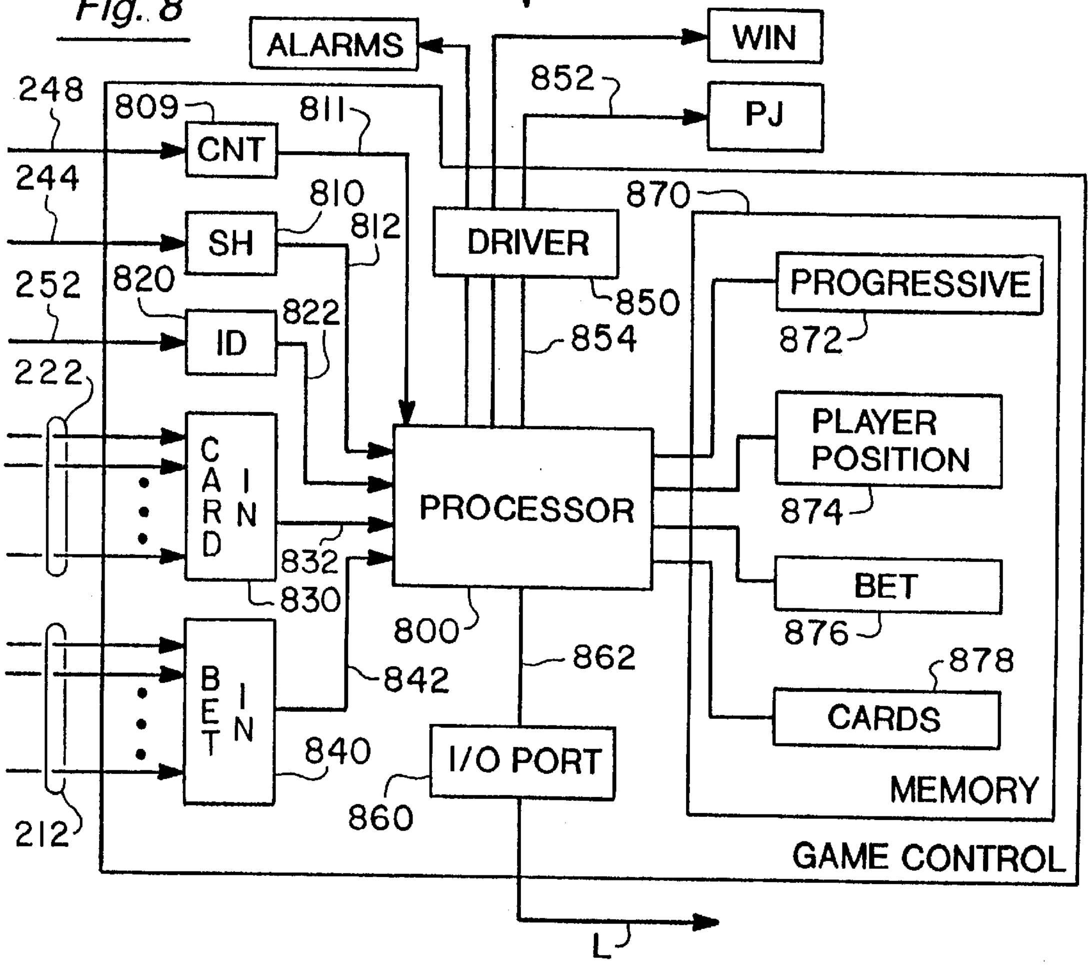

*Fig. 12*
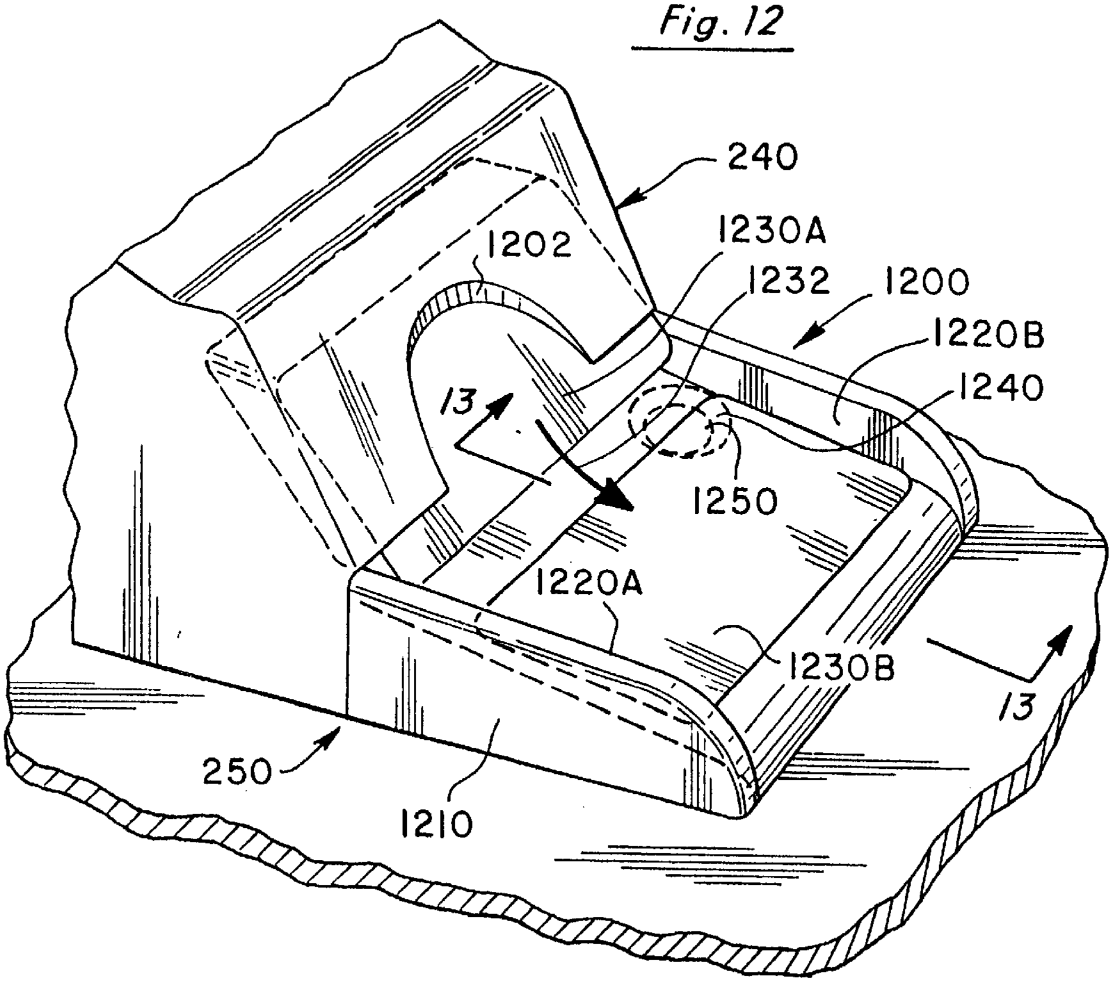
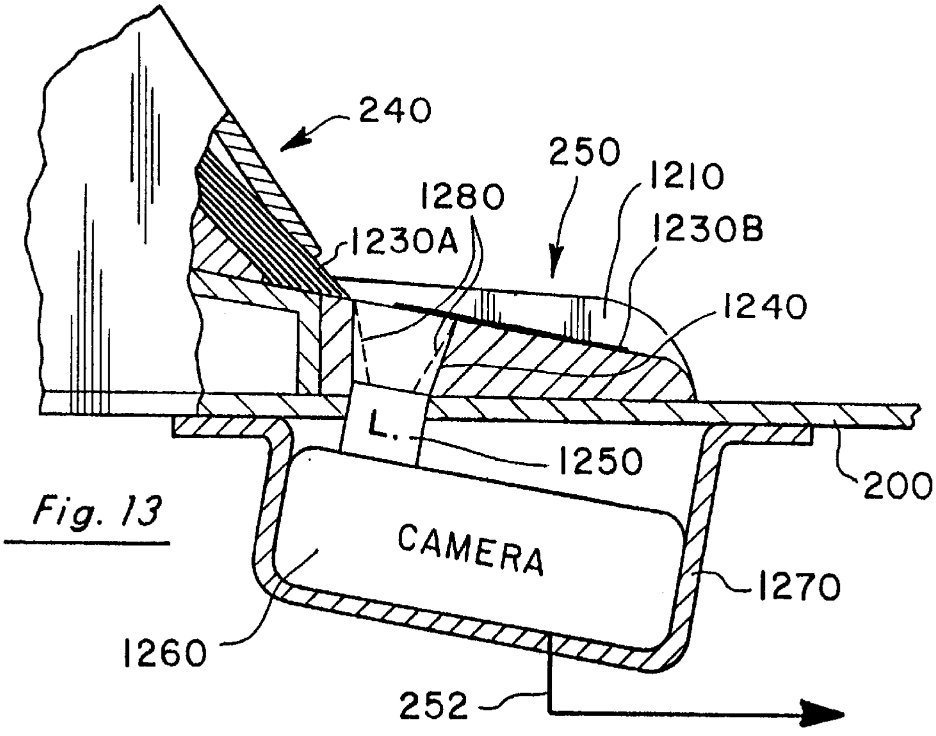
*Fig. 13*

*Fig. 14*
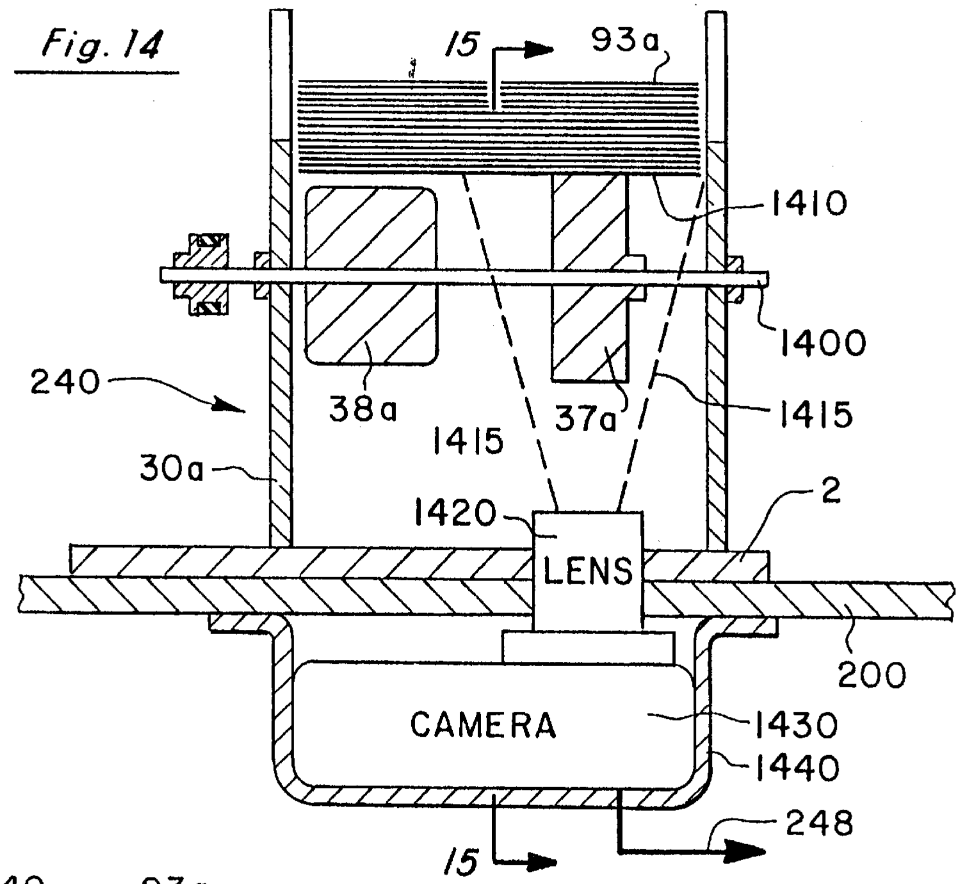
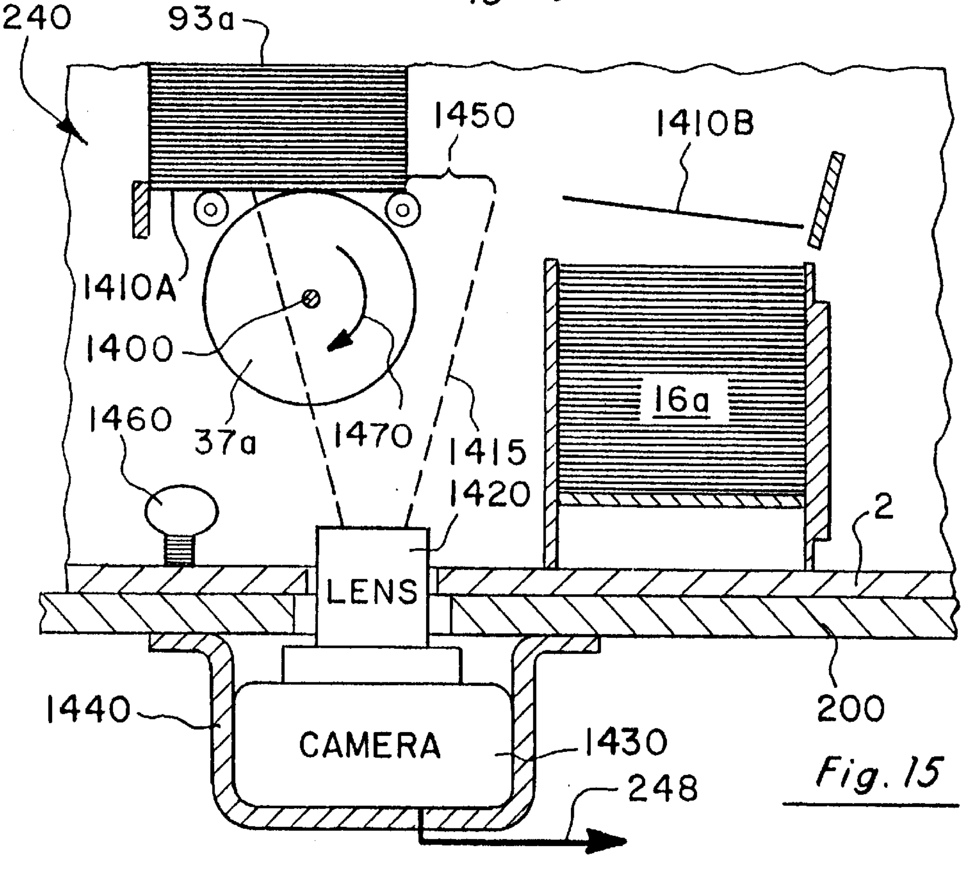
*Fig. 15*

SECURE MULTI-SITE PROGRESSIVE JACKPOT SYSTEM FOR LIVE CARD GAMES

This is a continuation of application Ser. No. 09/054,326, filed Apr. 2, 1998, which, in turn, is a continuation of Ser. No. 08/795,992, filed Feb. 5, 1997, now U.S. Pat. No. 5,735,525 issued Apr. 7, 1998, which, in turn, is a continuation of Ser. No. 08/420,303, filed Apr. 11, 1995, now U.S. Pat. No. 5,605,334 issued Feb. 25, 1997.

BACKGROUND OF THE INVENTION

1. Field of the Invention

The present invention relates to securing live card games and, more particularly, to securing multi-site progressive jackpots for live card games using automatic card shufflers.

2. Statement of the Problem

Progressive jackpot slot machines and live card games (such as Black Jack, Baccarat, Chemin de Fer, Pai Tow Poker, Draw Poker, Stud Poker, and Lo-Ball Poker) represent two types of games that are popular among gamblers throughout the world.

A need exists for a progressive jackpot system for live card games at remote sites. With players at numerous remote sites for the live card games, a security problem exists that becomes critically important as the size of the progressive jackpot grows. Since a live card game is played independently with card decks and dealers, there exists a substantial risk (into the millions of dollars) of cheating and/or card counting (whether legal or illegal). See Scarne's New Complete Guide to Gambling, by John Scarne, Simon & Schuster (1986) pages 382–388. The risk of cheating increases as the size of the progressive jackpot increases.

A need, therefore, exists to create a secure environment that permits the operation of multiple independent live card games linked together in a common system to the same progressive jackpot that provides significant security to prevent cheating and card counting. A need also exists for added levels of security for conventional live card games such as a secure automatic shuffler/shoe.

A "hand" is commonly defined as one deal of cards to the players in a live card game. A "deck" for a particular live card game has a predetermined number of cards. For example Black Jack uses a conventional card deck with four "suits" (diamonds, hearts, clubs, and spades) containing 13 cards of different "value" (ace through king) for a predetermined number of 52 cards.

U.S. Pat. No. 5,078,405 pertains to an apparatus for providing a progressive jackpot for live card games. The '405 patent allows each player to bet an additional "progressive" wager at the beginning of each hand by providing an apparatus to receive the progressive game token and to control a jackpot meter. The apparatus is built into the game table and any number of tables can be interconnected together to a single progressive jackpot meter.

U.S. Pat. No. 5,374,061 pertains to a card-dispensing shoe having a device that reads cards as they are dealt in a hand from the shoe. By using specially coded cards, indicating the value, the suit, and the deck identity of each card, this device enables the operator to detect when cards are added to, removed from, or substituted into a deck. The electronics in the shoe also determine and display the count of the game (i.e., the running count, the betting count, and a true count). This patent teaches an approach to providing two added levels of security for live card games (i.e., tracking the count and sensing when cards are improperly substituted at the point of dealing a hand).

U.S. Pat. No. 5,356,145 pertains to an automatic and continuous card shuffler that receives all playing cards after each hand is completed and continuously shuffles all the cards in the deck (or in multiple decks such as four decks) with the effect that every hand is dealt from a completely "fresh" and randomly shuffled deck (or multiple decks) of cards. This patent also provides a level of added security to live card games by greatly inhibiting the ability of a player to legally or illegally count played cards. A need exists for a secure shuffler that counts and identifies cards both entering and leaving the shuffler.

Pending German patent application P44 39 502.7 sets forth a computerized device that reads cards as they are dealt from a shoe and also senses when a hand is receiving cards at a position on a game table. The computer tracks each hand and records the value and suit of each card in each player's hand. The computer senses when a dealer has a Black Jack and immediately issues a signal. This approach electronically surveys each game and minimizes manual inspection of the game. These computers can be linked by various means to a central computer so that numerous hands played at numerous remote locations can be exactly monitored. This device prevents numerous forms of cheating by maintaining a history of every winning and losing hand played. The dealer never knows the hole card until it is played thereby eliminating any possibility of cheating between a dealer and a player by tipping their hole card. This patent application also provides an added degree of security to live card games.

A need exists to have a multi-site progressive jackpot system for live card games incorporating as many levels of security as possible into one integrated system.

SOLUTION TO THE PROBLEM

The present invention provides a solution to the above needs by providing a secure live card game table system that can be connected in a multi-site environment to a central control. Various levels of security are incorporated including identifying each card dealt by a dealer and storing the value and suit in memory; identifying which player positions have game bets and progressive bets in place; determining when a card is received at a player position; and ascertaining whether the player position that has received a card has placed a game bet and/or a progressive bet. The shuffler and shoe of the present invention counts and reads cards leaving the shoe and being inserted into the shuffler so as to prevent card substitution, addition or subtraction by the dealer or a player. The present invention also records the value and suit for each card received at each player position having a game bet placed. Finally, the present invention provides far a unique identity code for each deck physically placed on each card so that after a hand is played, and the cards are reinserted into the shuffler, a count is made and the code on each card is read. If the count is in error or the code does not match or is missing, an alarm signal is raised by the game control.

SUMMARY OF THE INVENTION

A secure game table system, adapted for multiple sites under a central control, is disclosed for monitoring each hand in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display is located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

BRIEF DESCRIPTION OF THE DRAWINGS

FIG. 7 is a flow chart setting forth the operation of determining a progressive jackpot winner, FIG. 8 is a block diagram setting forth the components of the game control.

FIG. 13 is a side view of the addition of FIG. 12,

FIG. 14 sets forth the addition of an optical reader for reading cards inserted into the automatic shuffler of FIG. 12, FIG. 15 is a side view of the addition of FIG. 14.

DETAILED DESCRIPTION OF THE INVENTION

1. Overview

Figure 1:
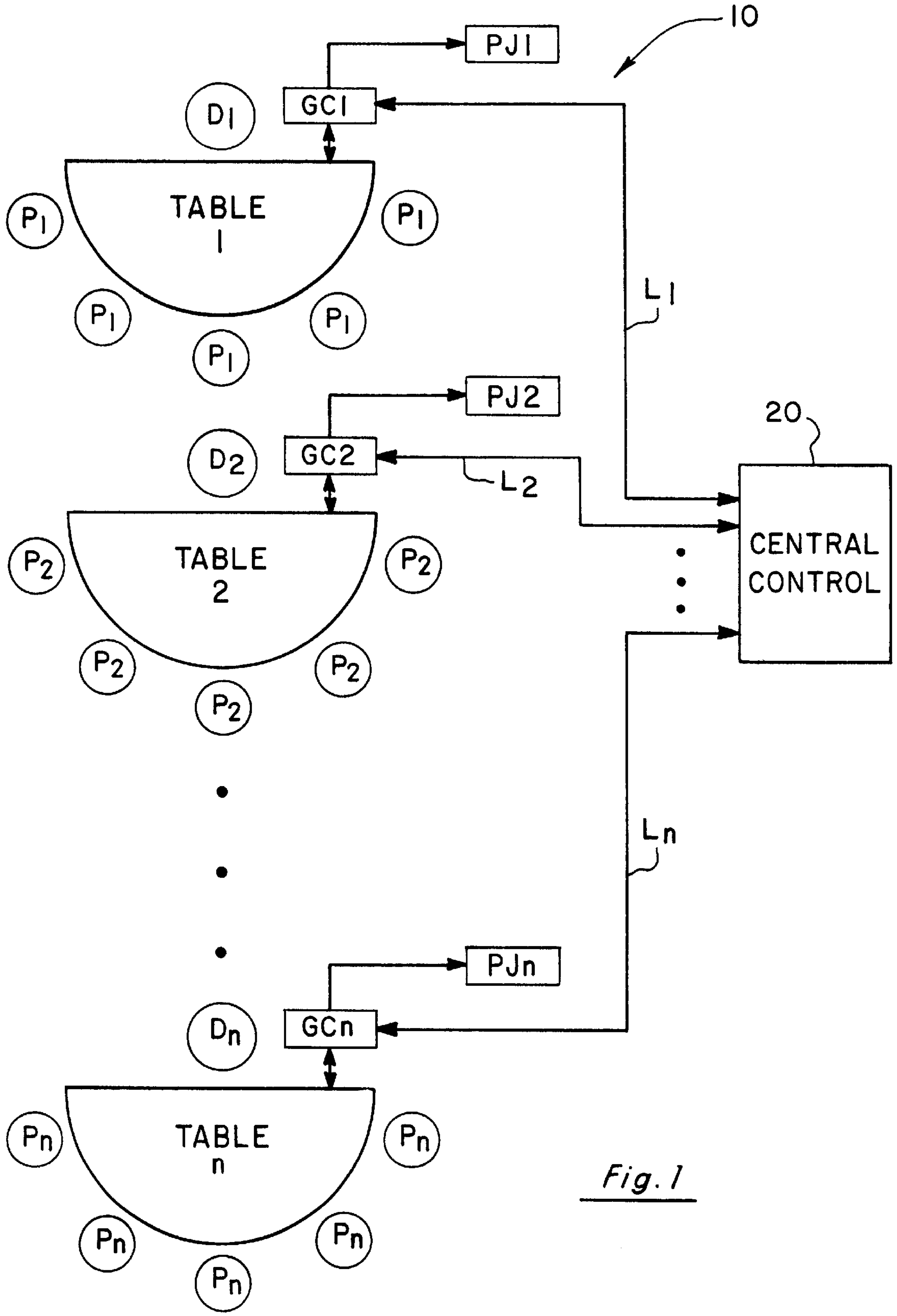
FIG. 1 sets forth a block diagram of the major components of the secure multi-site progressive jackpot system of the present invention, FIG. 2 sets forth the details of an individual gaming table of the present invention, FIG. 3 sets forth an example of a card carrying a code, FIG. 4 sets forth the card and betting areas of the system of the present invention, FIG. 5 (Prior Art) illustrates a coin acceptor and coin-in light.

In FIG. 1, the secure multi-site progressive jackpot system 10 of the present invention is set forth.

FIG. 1 shows a plurality of live card gaming tables (Tables 1 to n). These tables can be at different remote sites or a group of tables can be clustered at one site, and a group of tables can be clustered at a second site, etc. Indeed, each table could be located at the same site such as a single casino. For example, twenty gaming tables could be located on a floor of a single casino or twenty gaming tables could be located at twenty different locations in the same casino, or twenty gaming tables could be located with each table in a different casino.

The progressive jackpot system 10 of the present invention includes a central control 20 interconnected to the plurality of gaming tables (Tables 1 to n). At each gaming table is a game control GC that communicates to the central control 20 over a communications link L. The communications link L can be hard wired, a network connection, a telephone line, or any combination or other equivalent communications channel. The type of communication link L is not material to the teaching of the present invention.

At each gaming table is a progressive jackpot display PJ. As live card games are played at each table, each gaming control GC at each table delivers information over link L to central control 20, which continually evaluates all live card game information and provides display information back to each gaming control GC to activate the current displayed value of the progressive jackpot in each progressive jackpot display (PJ1 to PJn).

At each table is a dealer D and a number of players P. Hence, in the system of FIG. 1, live card games (such as Black Jack) may occur at each table. At each table one or a plurality of players P may be playing a card game with a dealer D. The game control GC at each table monitors the progress of each live card game including the progressive wager information and delivers that information over the communications link L to the central control 20. The central control 20 updates the progressive jackpot information and continuously displays new values in the progressive jackpot displays (PJ1 to PJn).

System 10 of the present invention is not limited to a particular type of live card game, to a particular number of tables, or to a particular number of players. When a player at one of the tables has placed a progressive bet and is dealt a predetermined winning combination of cards (e.g., Ace of clubs, 2 of clubs, 3 of clubs, 4 of clubs, and 5 of clubs), the player wins the presently displayed jackpot value, and the central control 20 is informed by the game control GC at that table over link L and proceeds to update ail other game controls and displays at the other tables so that all players and dealers know that a win occurred.

2. Details of a Gaming Table

Figure 2:
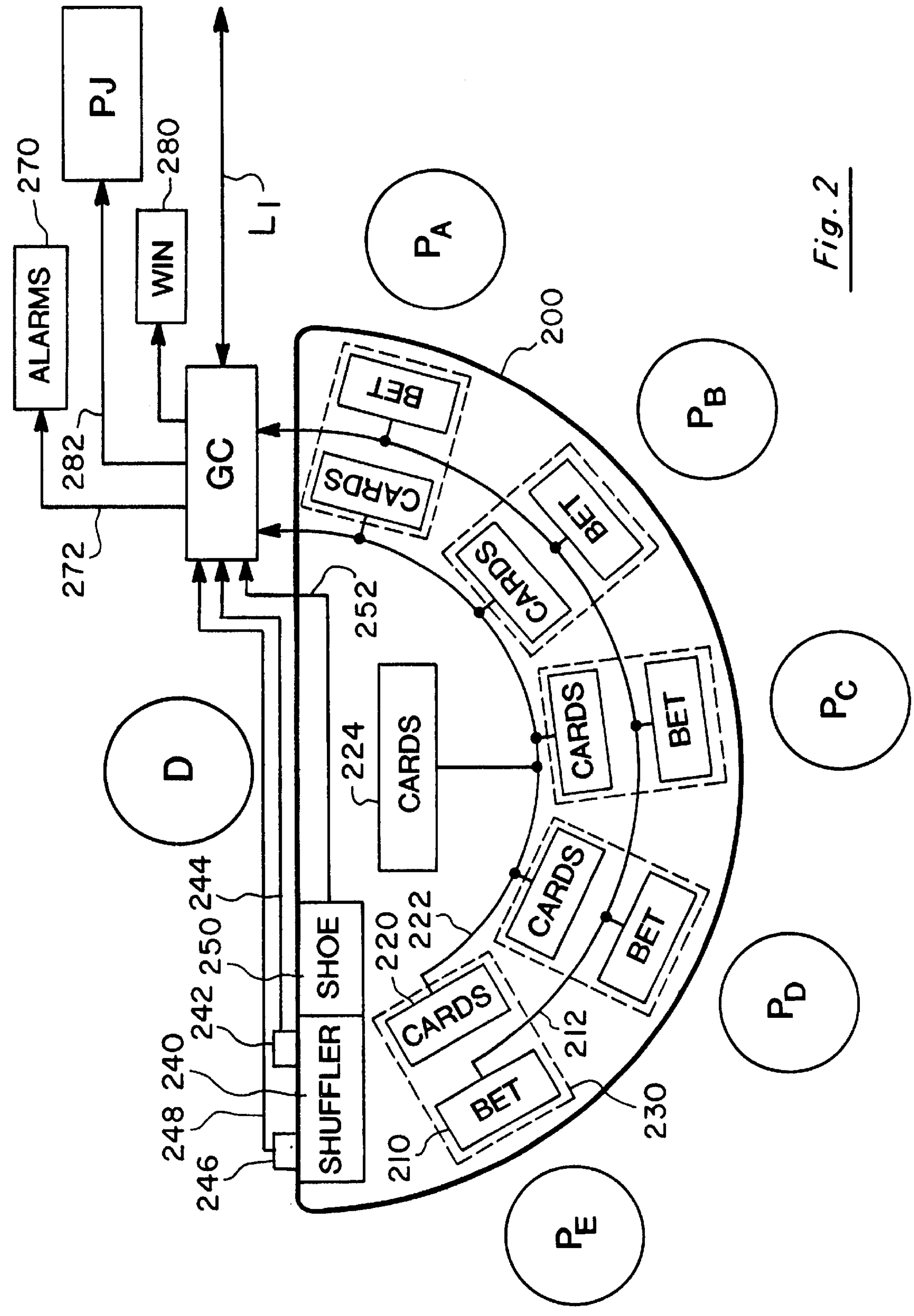

In FIG. 2, an individual gaming table 200 is shown having player positions $P_A$ to $P_E$. It is to be understood that any number of player positions could be provided.

As set forth in FIG. 1, each gaming table 200 has a game control GC interconnected to a progressive jackpot display PJ for displaying the current progressive jackpot.

The game control GC may have conventional inputs, outputs, and displays, not shown. For example, a dealer could input his name and other information upon arriving at a game table. The display PJ can display a plurality of progressive jackpots based on different winning card combinations. Likewise the display PJ can also display the names of winners and the payout from other tables in the system. This type of feedback adds excitement to the progressive live card game and encourages players to place progressive bets while playing a live card game. The game control GC also issues alarm and win signals 270 and 280, which may constitute audible and/or visual signals to the players P, dealer D, or others (such as a pit boss). These signals may also be delivered over link L to the central control 20.

At each player position P is a betting area 210 and a card-receiving area 220. The dealer D also has a card-receiving area 224. Each betting area 210 is interconnected over lines 212 to the game control GC. In the preferred embodiment, each betting area 210 is individually interconnected over lines 212 to the gaming control GC. It is to be understood that lines 212 could be a bus and the gaming control GC could sequentially interrogate each betting area 210.

Likewise each card-receiving area 220 and 224, in the preferred embodiment, is interconnected over lines 222 with the gaming control GC. Rather than having individual lines 222 each card area 220 and 224 could also be interconnected to a single bus. As shown in FIG. 2, each betting area 210 and each card area 220 is positioned in a location near the playing position 230 of each player P.

Also located on table 200, in the preferred embodiment, is an automatic card shuffler 240. This card shuffler 240 may be of the type, but not limited to, conventionally taught in U.S. Pat. No. 5,356,154, and as modified herein. Card shuffler 240 is designed to shuffle one or a plurality of decks after each hand so that when a hand is played, the discarded cards are inserted back into the shuffler 240 and reshuffled. This technique substantially minimizes, if not eliminates, card counting, thereby adding a high degree of security to the game. Under one embodiment of the present invention, a sensor 242 could be connected to the shuffler 240 to detect each time the shuffler 240 is activated to shuffle. The sensor 242 is connected over line 244 to the game control GC 244. The system 10, however, does not require an automatic shuffler and is operational with conventional live shuffling by the dealer.

Figure 3:
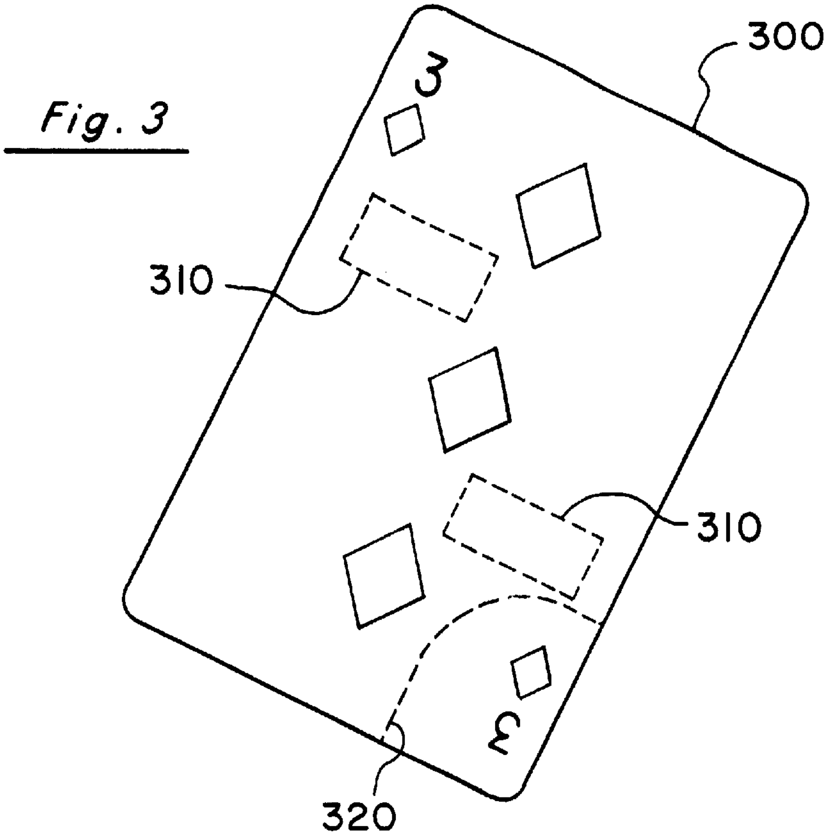

The shuffled cards (whether automatic or live) are delivered into a shoe 250 for dealing by the dealer D. The shoe 250 may be of the type, but not limited to, conventionally taught in U.S. Pat. No. 5,374,061 that requires the use of a specially coded deck of cards. Card 300 in another embodiment, shown in FIG. 3, is imprinted with a code in region 310. As each card is passed through the shoe 250 from the shuffler 240, a reader in the shoe 250 reads the code in region 310 and delivers a signal over a line 252 to the game control GC. The shoe 250 transmits to the game control GC the identity of the card being dealt by the dealer D. This identity includes the value of the card, the suit of the card, and, in one embodiment, the identity of the deck the card is from. All of this occurs without the dealer or any player knowing what the card is. The identity of the deck is critical as this prevents unauthorized interchanging of playing cards (i.e., adding marked cards) either by the dealer or by a player or by a combination of the dealer and a player. In addition, the three identity values are used to fully record in the gaming control GC the history of each hand (and, therefore, of each game) as it is delivered by the shuffler 240 into the shoe 250 and is dealt by the dealer D.

It is to be understood that even though a specially coded card is utilized, any variations on this concept could be incorporated. For example, rather than using a coded card 300 as shown in FIG. 3, an optical image of each card could be obtained at the shoe, delivered over line 252, and stored in the gaming control GC as taught by the above-identified German patent application. While this approach requires more memory, it also provides a digital image of each card as it is dealt from the shoe 250. When the dealer D deals a card from the shoe 250, only the gaming control GC knows the identity of the card being dealt. Once the image is received for each card, the game control GC using pattern recognition software can read the value and suit of each imaged card.

In another embodiment, a separate circuit 246 is placed on the shuffler 240 to count the cards inserted from the previously dealt hand and to read each card deck identity on each inserted card to verify, that the same number of cards dealt in that hand are delivered back into the shuffler 240 and (2) that the cards placed into the shuffler 240 are the actual cards dealt based on deck identity. This circuit 246 can be, but is not required to be, the same kind of reader that is found in the shoe 250, reading the same code or taking the optical image of the card as it is deposited into shuffler 240. This prevents a player (or dealer) from withholding cards or from substituting cards. An alarm signal is sounded when a wrong count occurs. If a deck identity code is used, an alert signal is sounded when a card is not verified as being from the deck. The count and verification signals are issued over a line 248 to the game control GC. In this embodiment, an infrared deck identity code, invisible to a player's eyes, may be imprinted on each card in, for example, region 310. The circuit 246 located in the shuffler reads the imprinted deck identity code and issues a signal corresponding to the read code over line 248 to the game control. In yet another embodiment, circuit 246 and shoe 250 both incorporate optical readers, thereby enabling the game control GC to verify that the same number of cards, each of the same value and suit, were returned to shuffler 240 as were dealt from the shoe 250. In the most secure embodiment of the invention, circuit 246 and the reading device in shoe 250 are incorporated into the same shuffler 240 as will be discussed later with respect to FIGS. 12–17. Thus, once a card is read by circuit 246 it enters a secure environment within the shuffler 240 where it can not be touched again by human hands until it has made its way through the shuffler 240 and is presented to the dealer through the shoe 250 after its value and suit have been read and recorded in the game control GC.

3. Play Area

Figure 4:
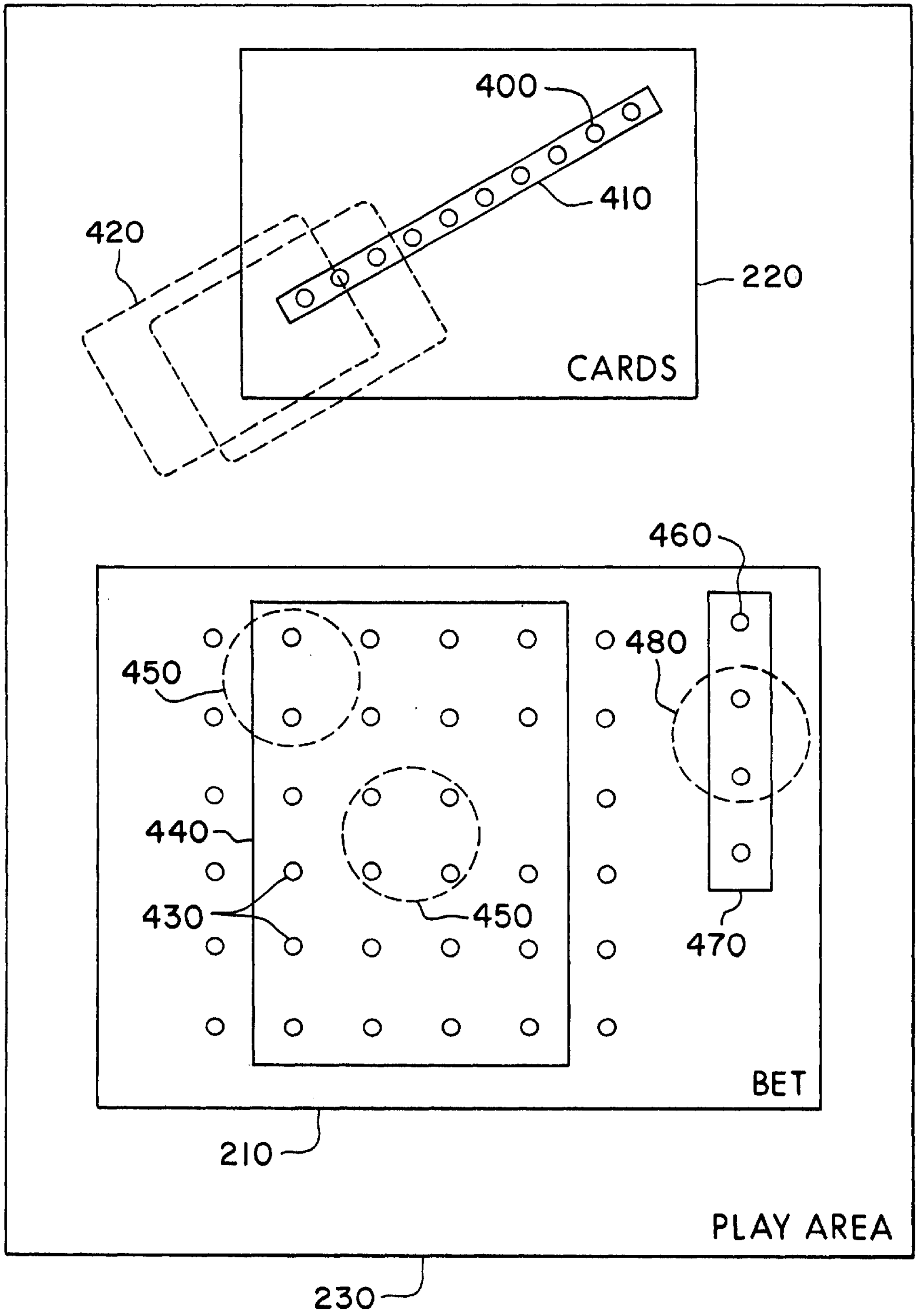

The details of each play area 230 are shown in FIG. 4.

Each play area 230, as mentioned, has a card area 220 and a betting area 210. In the card-receiving area 220 are placed a plurality of sensors 400 located in a predefined region 410. The sensors 400 could be photocells or any suitable sensors that are individually interconnected over lines 222 to the game control GC. Playing cards 420 are placed in the card region 220 by the dealer D, and as each card 420 is placed over the sensors 400, the placement of the card by the dealer D is detected and recorded by the gaming control GC. Hence, the game control GC accurately records the delivery of a card to a playing area 230 of a particular player position P.

Also in the play area 230 is a betting area 210 that has a first plurality of sensors 430 located in a betting region 440 for detecting the presence of a coin or token 450. Likewise a separate plurality of sensors 460 are located in a progressive bet region 470 to sense a progressive bet 480. The sensors 430 and 460 are interconnected over individual lines 212 back to the gaming control GC. The gaming control GC senses the presence of each token 450 and 480 and provides a count and, optionally, a value.

Figure 5:
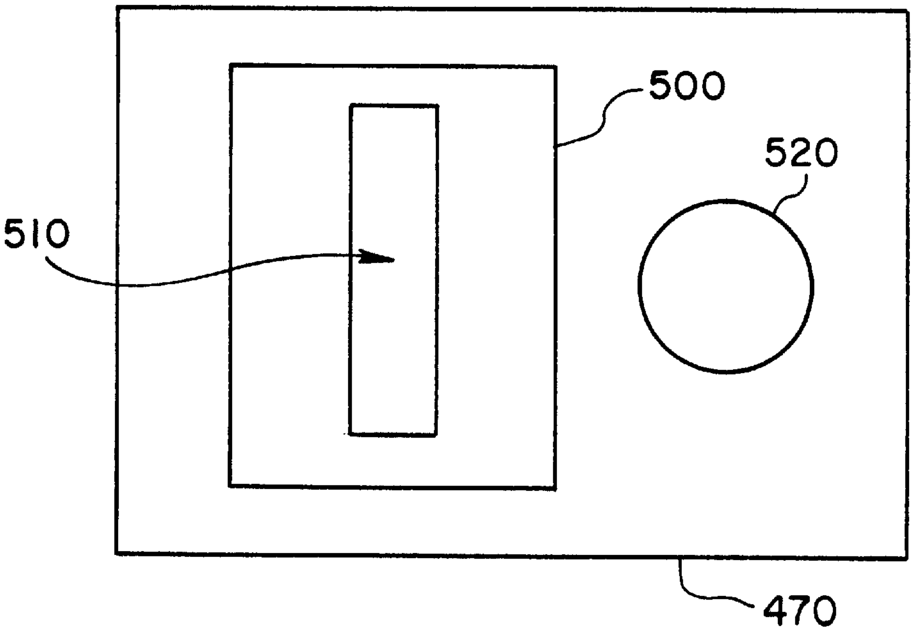
Fig. 5 (Prior Art)

The sensors 400 and 430 and the regions 410 and 440 are conventional and are found in the German patent application identified above. The sensors 460 and the region 470 are adapted under the teachings of the present invention for a progressive bet. It is to be expressly understood that rather than use sensors 460, the progressive bet region 470, as shown in FIG. 5, could have a coin acceptor 500 with a coin-in slat 510. In this embodiment, an indicator light 520 must be provided to indicate successful acceptance of the coin. Coin acceptor and indicator lights are conventional in the gaming industry and any of a number of different coin acceptors could be utilized under the teachings of the current invention.

The fact that a bet is placed is important. Hence, the presence of the game bet and the presence of a progressive bet enables the game control to identify the player position and to correlate the cards delivered to that player position as will be explained.

Any number of devices could be used to detect the placement of bets in either region 470 or 440. For example, coin acceptors, credit or debit card readers, or optical image cameras could be used in either or both areas.

4. Operation

Figure 6A:
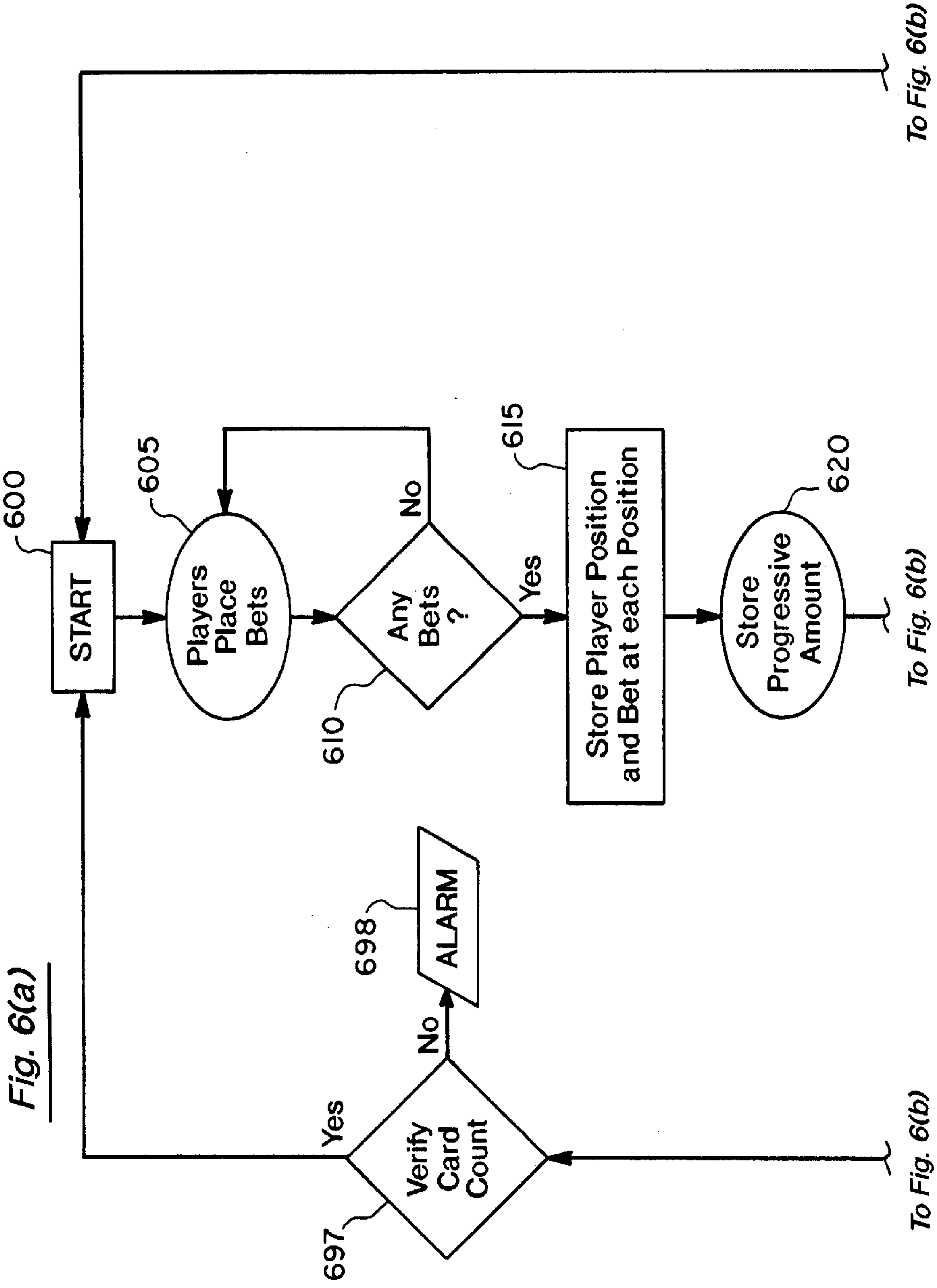
FIG. 6 is a flow chart setting forth the operation of the present invention.
Figure 6B:
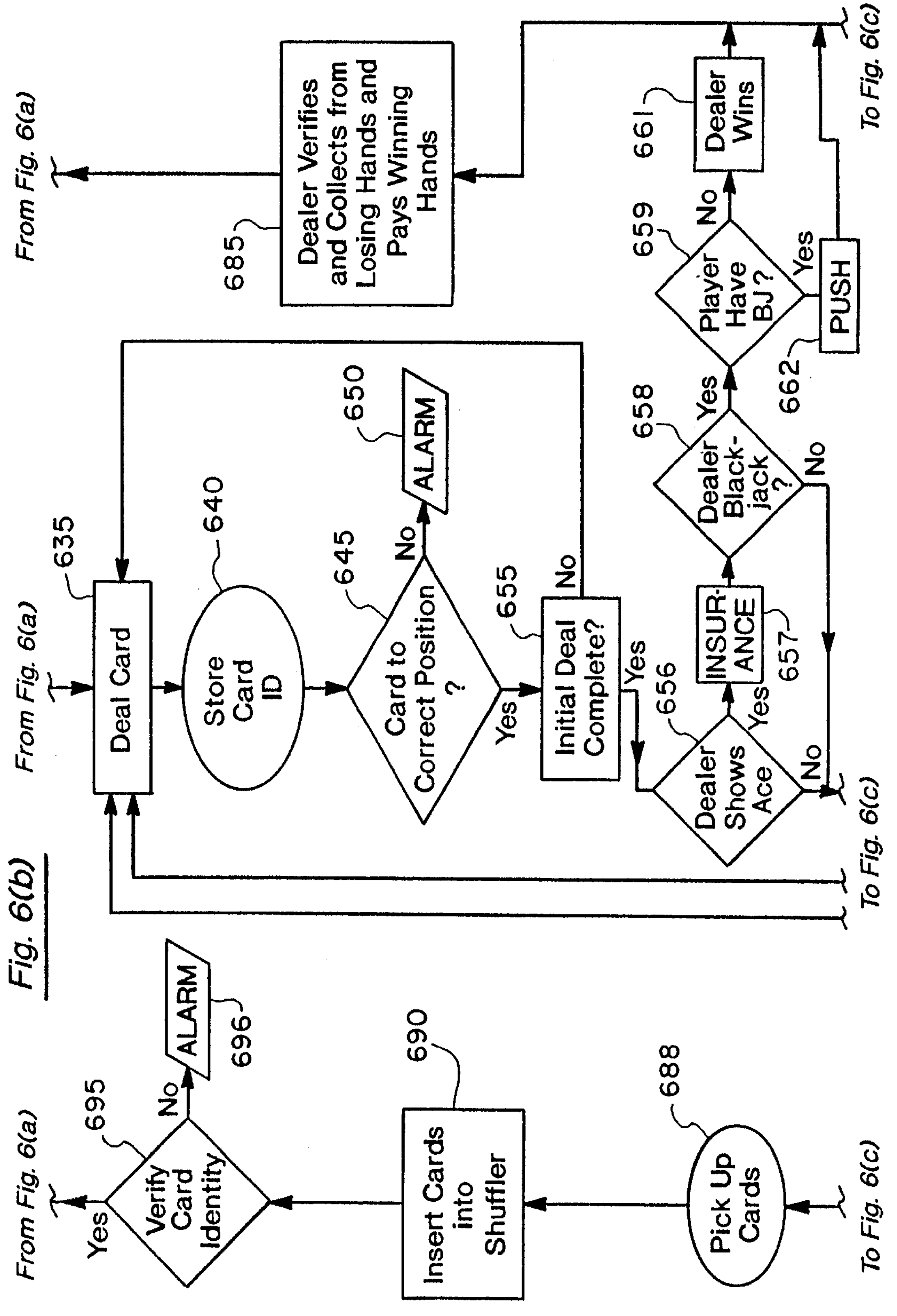
Figure 6C:
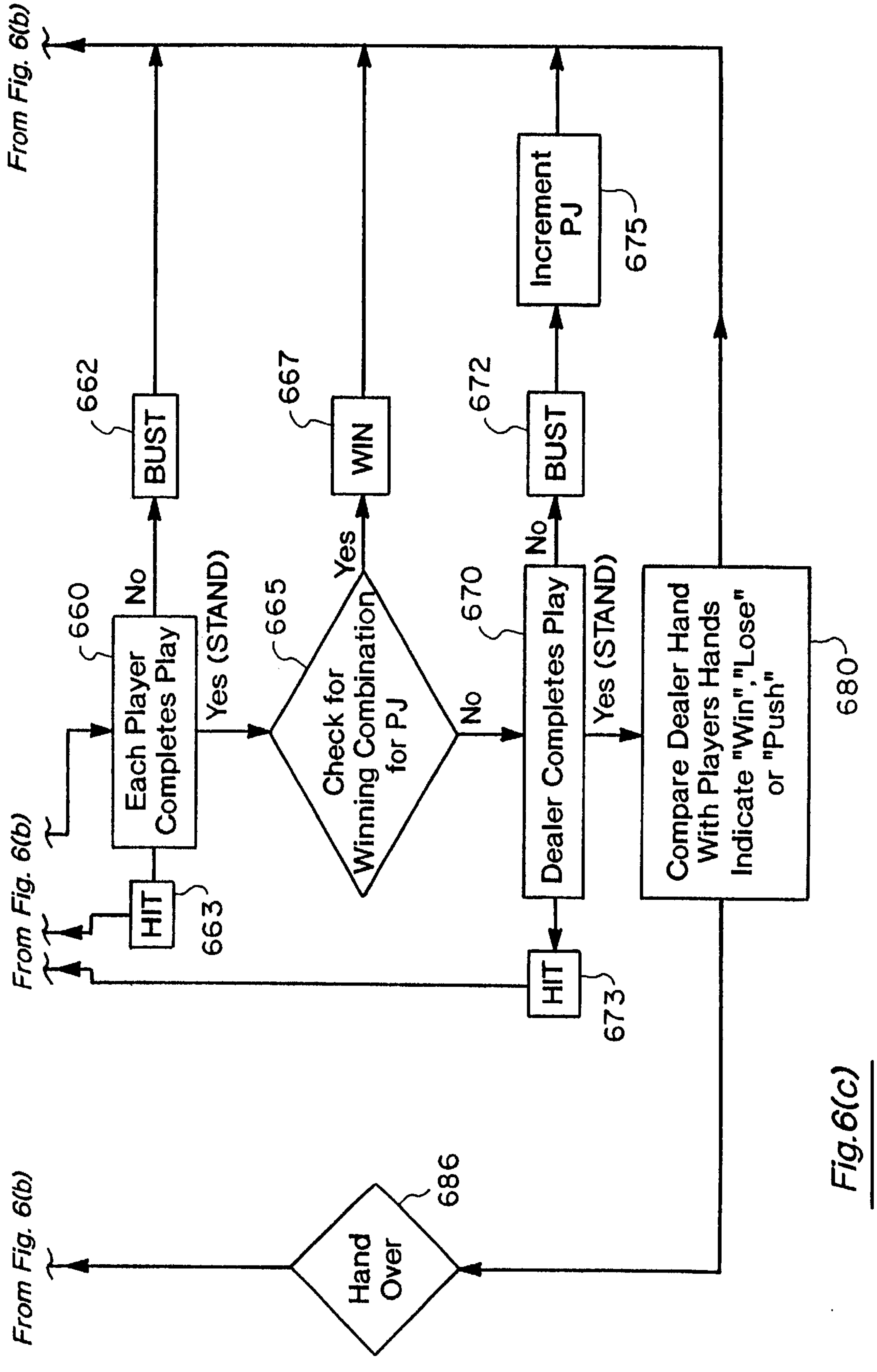

In FIG. 6, the operation of the system 10 of the present invention is set forth with play at a particular table. With reference to FIGS. 2 and 4, the operation of the present invention occurs as follows. At the start of the deal 600 the players are requested to place bets.

EXAMPLE I

Assume in FIG. 2 the following ensuing game configuration for Black Jack:

TABLE I

| Player Position | Bet | Progressive Bet | Cards Dealt | | |
|---|---|---|---|---|---|
| A | — | — | | | |
| B | 2 | 1 | 10C | 7H | STAY |
| C | — | — | | | |
| D | 1 | 1 | JS | 2H | 5C |
| E | 3 | — | 3D | QC | KH |
| Dealer | | | 10H | 8S | |

Where:
10C = 10 of Clubs
JS = Jack of Spades
3D = 3 of Diamonds
10H = 10 of Hearts
7H = 7 of Hearts
2H = 2 of Hearts
QC = Queen of Clubs
8S = 8 of Spades
5C = 5 of Clubs
KH = King of Hearts The start of the hand may occur several ways. For example, when the cards are played in the immediately prior hand and returned to the shuffler, the shuffler 240 counts and verifies the returned cards. When this task is complete, a new hand begins as determined in the game control GC. Or, a switch in circuit 246 can be pressed causing shuffling to occur or to indicate a new hand.

The players place the bets in stage 605 as set forth in Table I. The game control GC interrogates the betting areas 210 of each player position 230 and ascertains that bets have been placed in stage 610. If no bets have been placed, it returns to the placement of bets stage 605 and cycles. When bets are detected, the game control GC counts the bets in each betting region 440 and 470. The game control GC stores in memory for each player position the game bets placed in region 440 in stage 615 and stores for each player position any progressive bets made in region 460 in stage 620. In Table I, for example, players A and C did not place bets. Players B, D, and E placed game bets of 2, 1, and 3, respectively. Players B and D each placed a progressive bet.

At this point, the game control GC for each player position that has a game bet placed and/or a progressive bet placed has stored that information in memory. If an invalid situation occurs such as detecting a progressive bet at a player position where a game bet has not been placed, an alarm signal 630 is raised in stage 625 for delivery to alarm 270. Otherwise, the hand is ready to be dealt.

The dealer deals the first card in stage 635 from the shoe 250 to the first player position with a bet (i.e., $P_B$ in Table I). The game control GC stores the identity (or the optical image) of the first card dealt from the shoe in stage 640. This includes the card count. The dealer places the first card in the card area 220 over region 410 for Player $P_B$ as shown in FIG. 4. The delivery of the card to this player region 410 by the dealer is sensed by sensors 400, and the game control GC makes a decision in stage 645 as to whether the card was, in fact, delivered to the correct position. The correct position is determined as follows. The game sequence proceeds from player position $P_A$, $P_B$, . . . to the dealer D, but skips all players not placing a game bet. Different live card games have difference game sequences which are programmed into the game control.

For example, if the card is delivered to player position $P_A$ (in our example), then an alarm signal 650 would be raised and delivered to alarm 270. However, if it is delivered to the correct player position, in sequence which in Table I is player position $P_B$, then the game control GC interrogates, in the case of Black Jack whether the dealer has 21. Since the dealer, at this point in the operation, has not yet been delivered a card, stage 655 is left and stage 660 is entered. At this point, the game control GC interrogates whether a progressive winner has occurred, and since cards are still being dealt, stage 670 is entered as to whether the hand is over. Again, the answer is no and the dealer deals another card in stage 635 from the shoe 250. This process of dealing a new card and determining the delivery of the card to the correct sequential player position occurs until the hand is fully played.

With respect to our example, and as shown in the above chart, Player B receives a 10 of Clubs, Player D a Jack of Spades, and Player E a 3 of Diamonds. The dealer receives a 10 of Hearts. The game control GC has stored in memory the identity of each card with respect to each player position in sequence that has placed a game bet and has verified that the cards were correctly delivered to the proper player positions.

The deal continues with Player B receiving a 7 of Hearts, Player D a 2 of Hearts, and Player E a Queen of Clubs. The dealer receives an 8 of Spades. Again, the game control GC has stored the identity of each card received at each player position 220 and at the dealer position 224. The game control GC has verified that each card has been delivered to the correct player position.

Player B decides to stay and not receive another card. As taught by the above-identified German patent application, Player B may push a stay or hold button, not shown, that informs the game control GC and lights a light informing the dealer that Player B does not wish a new card. Player D receives a 5 of Clubs and Player E then receives a King of Hearts. Player E, of course, went over 21 and hence the play is between Player D and the dealer. In this example, the dealer wins and removes all the bets including the progressive bets. It is to be understood that other bets could be made and sensed such as splits, insurance, etc., as taught by the German patent application.

When the hand is over 670, the dealer picks up the cards 684 and inserts the played cards into the shuffler 686. As the shuffler 240 takes each inserted card to be added to the cards being shuffled, circuit 246 counts each card and issues a count signal over line 248 to the game control GC. In one embodiment, the circuit 246 reads the card identity code 310 (which may include the deck identity) on each card and delivers that reading back to the game control GC over line 248. The game control GC verifies in stage 688 the correct deck and, if not, raises an alarm signal 690 for delivery to alarm 270. If the card is of the correct deck, then the cards are fully counted and the game control GC in stage 692 verifies the correct count. If the count is not correct, then an alarm signal is raised 694 for delivery to alarm 270. A new deal 600 commences if the count is correct.

In one preferred embodiment for an integrated shuffler/shoe of FIGS. 12–17, discussed later, stages 640, 688 and 692 would occur through tracking (and storing) of digital images of a portion, or all, of the face of a card. As each card leaves the shoe 250, an image is captured and stored, the captured images are counted to arrive at a count. Upon completion of a hand, the cards are inserted into a shoe and images are again captured and stored, the captured images are counted. The count from these two operations are compared and, if not the same, an alarm 694 is raised. The images are compared and if not the same an alarm 690 is raised.

EXAMPLE II

Assume the following Black Jack example:

TABLE II

| Player Position | Bet | Progressive Bet | Cards Dealt | |
|---|---|---|---|---|
| A | 2 | 1 | 4C | 10S |
| B | 2 | — | 9H | 3H |
| C | — | — | | |
| D | — | — | | |
| E | 3 | 1 | 2S | QC |
| Dealer | | | KH | AS |

Where:
4C = 4 of Clubs
9H = 9 of Hearts
2S = 2 of Spades
KH = King of Hearts
10S = 10 of Spades
3H = 3 of Hearts
QC = Queen of Clubs
AS = Ace of Spades Here the cards are dealt, their identity is stored, and the position of each card is recorded and verified for each player and the dealer. However, in this example, when the dealer is dealt the Ace of Spades, the game control GC knows that the dealer has a winning 21 card combination and the game control GC in stage 655 raises a win signal 675 that the dealer has 21 and delivers it to win circuit 280. After all insurance bets, if any, are registered, the dealer is notified by the game control GC that he has a winning hand. The dealer in stage 680 verifies this by turning the cards over for all to see. This adds a significant level of security since in some conventional Black Jack games, the dealer initially looks at the hole card when he has a face card or ace to see if he has 21. The dealer may then be able to signal other players in the game information concerning his hand. The present invention eliminates this possibility from occurring.

EXAMPLE III

The following Black Jack example illustrates the progressive win characteristic of the present invention.

TABLE III

| Player Position | Bet | Progressive Bet | Cards Dealt | | | | |
|---|---|---|---|---|---|---|---|
| A | 3 | 1 | AS | 2S | 3S | 4S | 5S |
| B | — | — | | | | | |
| C | 2 | — | 5D | JH | 4C | | |
| D | 2 | 1 | QC | KD | | | |
| E | — | — | | | | | |
| Dealer | | | 10H | 2H | JC | | |

Where:
AS = Ace of Spades
5D = 5 of Diamonds
QC = Queen of Clubs
10H = 10 of Hearts
2S–5S = 2 through 5 of Spades
JH = Jack of Hearts
4C = 4 of Clubs
KD = King of Diamonds
2H = 2 of Hearts
JC = Jack of Clubs Players A, C, and D and the dealer receive their first two cards as conventional in the game sequence for Black Jack. Player A then receives three additional cards (i.e., in the game sequence "hits") and ends up with a progressive jackpot win sequence of: Ace of Spades, 2 of Spades, 3 of Spades, 4 of Spades, 5 of Spades. The system in stage 660 determines the sequence (as well as the player $P_A$) and issues a win signal 685 and delivers it to win circuit 280. The dealer D verifies the winning progressive sequence. The game continues to play with player $P_c$ receiving a 4 of Clubs, player D holding, and the dealer going bust.

In FIG. 7 the details for the stage 660 of FIG. 6 for determining the progressive winner are set forth. Since the game control GC knows the identity of each card as it leaves the shoe 250 of FIG. 2, when a winning combination of cards is sequentially detected and it is for the same player position 710, then a progressive win has occurred. It is to be expressly understood that any winning combination of cards can be programmed into the game control GC either at the table or from the main central control as shown in FIG. 1 over the communication line L. It is also to be expressly understood that the cards do not necessarily have to come out in the exact sequence, only that a winning combination occurs. Hence, if the winning combination was: Ace, King, and Queen of Hearts, the following detected sequences of Hearts would result in a winning combination: Ace King Queen, Ace Queen King, King Queen Ace, King Ace Queen, Queen Ace King, and Queen King Ace. Regardless of the time sequence that the cards were dealt in the hand to the winning player position, the winning progressive combination for that player position is detected.

Under the teachings of the present invention, upon the immediate detection of a progressive winning combination, the game control GC for that table issues a winning signal 685 not only to that table but to the central control over link L, which can notify all the other tables. It is to be understood that while a preferred order of operation is set forth, variations may occur under the teachings contained herein. For example, stages 692 and 688 could occur in any order.

5. Game Control

In FIG. 8, the details of the game control GC are set forth to include a processor 800 and input circuits 809, 810, 820, 830, and 840. Conventional inputs, outputs, and monitors are not shown. Input circuit 809 receives the count signal and, in one embodiment, the deck identity signals from circuit 246 issued over line 248 and delivers them over lines 811 to the processor 800. Input circuit 810 receives the signals from the shuffler 240 issued over line 244 and delivers them over line 812 into the processor 800. Input circuit 820 receives the identity of the card signals from the shoe 250 that are issued over line 252 to circuit 820. If the identity of the card is based on a bar code, the signals coming in over line 252 could be digital. However, if an optical image of the card is taken, then line 252 may be a video data bus and circuit 820 is a conventional video input circuit. Input circuit 830 is connected to lines 222 and receives signals on the receipt of cards in area 220. Input circuit 840 is connected to lines 212 which receive inputs from the sensors in the bet region 210. The processor 800 is connected to a driver circuit 850 that delivers display signals over lines 852 to the progressive jackpot display PJ. The processor 800 is connected to a standard I/O port 860 that is connected to the communications link L and in turn is connected over lines 862 to the processor. In some environments, the I/O port 860 could be a modem. The processor 800 is also interconnected to a memory 870. The current value of the progressive jackpot PJ is stared in memory 872. The player position 874 is stored, and for each player position the bet history 876 is stored and the cards played 878 are stored. If an optical image of each card is made in shoe 250, the card memory storage 870 is sufficient to hold large amounts of data.

With reference to FIG. 6, in stage 615, the player position is stored in memory 874. The bets with respect to that player position in stage 620 are stored. Finally, the individual hands for a game area stored in stage 640 into memory 878.

It is to be understood that the hardware configuration of FIG. 8 can comprise any suitable hardware configuration but that in the preferred embodiment the processor 800 is a conventional 486 micro-processor or any of the Pentium® series processors.

6. Central Control

Figure 9:
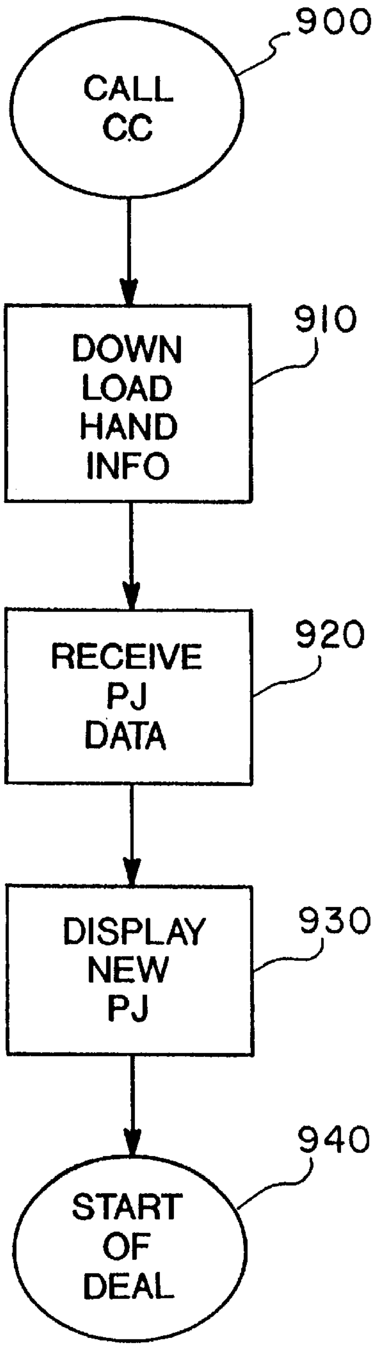
FIG. 9 is a master control flow chart setting forth the communication with the central control.
Figure 10:
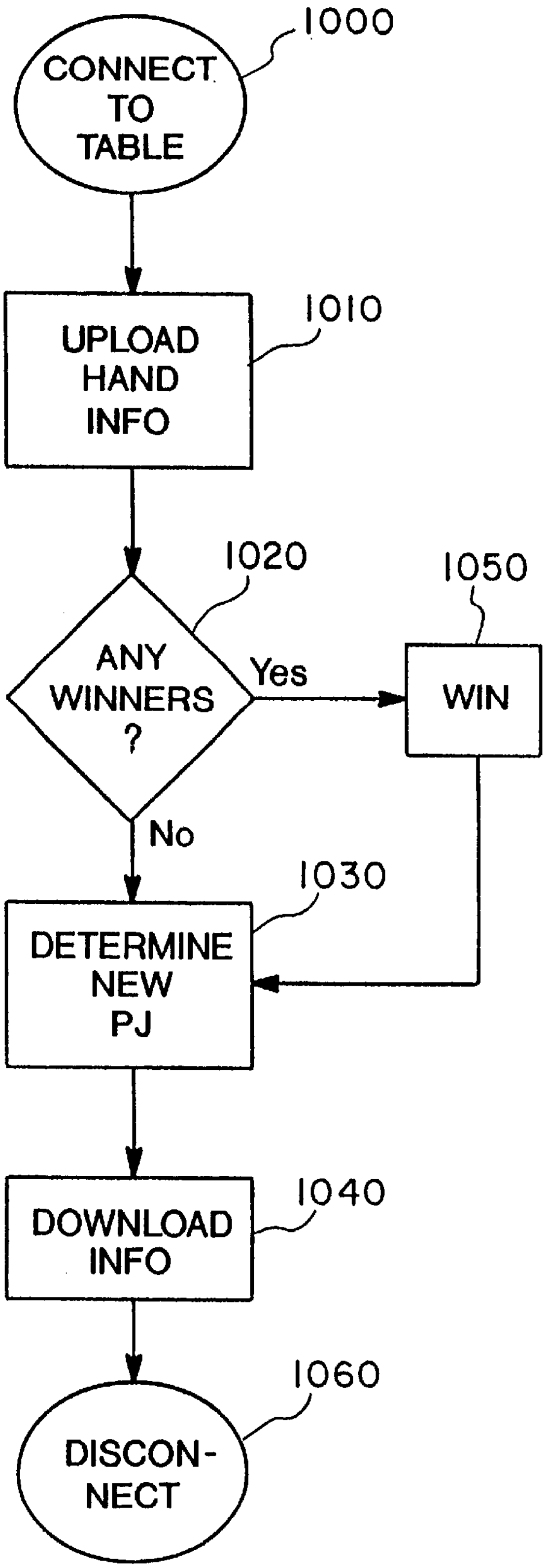
FIG. 10 is a central control flow chart setting forth the communication with a game control.

In FIGS. 9 and 10 the flow between the central control and each table is set forth.

From the game table viewpoint, and in the master control, the central control is selectively called 900 over the communication link L. The master control down loads all or part of the hand information which may include: the amount of the progressive bets placed during the hand (for example one token per player position sensed), the history of the game including the value and suit of each card dealt from the shoe and the value and suit of each card to each player position and any alarms detected such as a card without a proper deck identity, etc. Upon completion of the download, information may be delivered from the central control to the master control. For example, the new progressive jackpot value 920 would be received and the master control would then update and display in stage 930 the new progressive value. This would indicate the start of a new hand 940.

Likewise, from the viewpoint of the central control, it is connected to a given table 1000 and it uploads the information in stage 1010 which corresponds to the information downloaded in stage 910 of FIG. 9. The central control determines in stage 1020 if there are any winners during the last hand. If there are no winners stage 1030 is entered and based upon the value of the progressive bets placed from all of the tables, the central control determines a new progressive jackpot value and downloads it over the communication link L in stage 1040. Other information could also be downloaded including the identity of the winner and table if a progressive jackpot win occurred elsewhere in the system. New combination codes for progressive jackpot wins can also be downloaded. If a winner is detected in stage 1020, then stage 1050 is entered and the necessary winner information is obtained and documented. The jackpot must now be adjusted downwardly to reflect the win in stage 1030. After downloading information to the master control the central control in stage 1060 disconnects.

Figure 11:
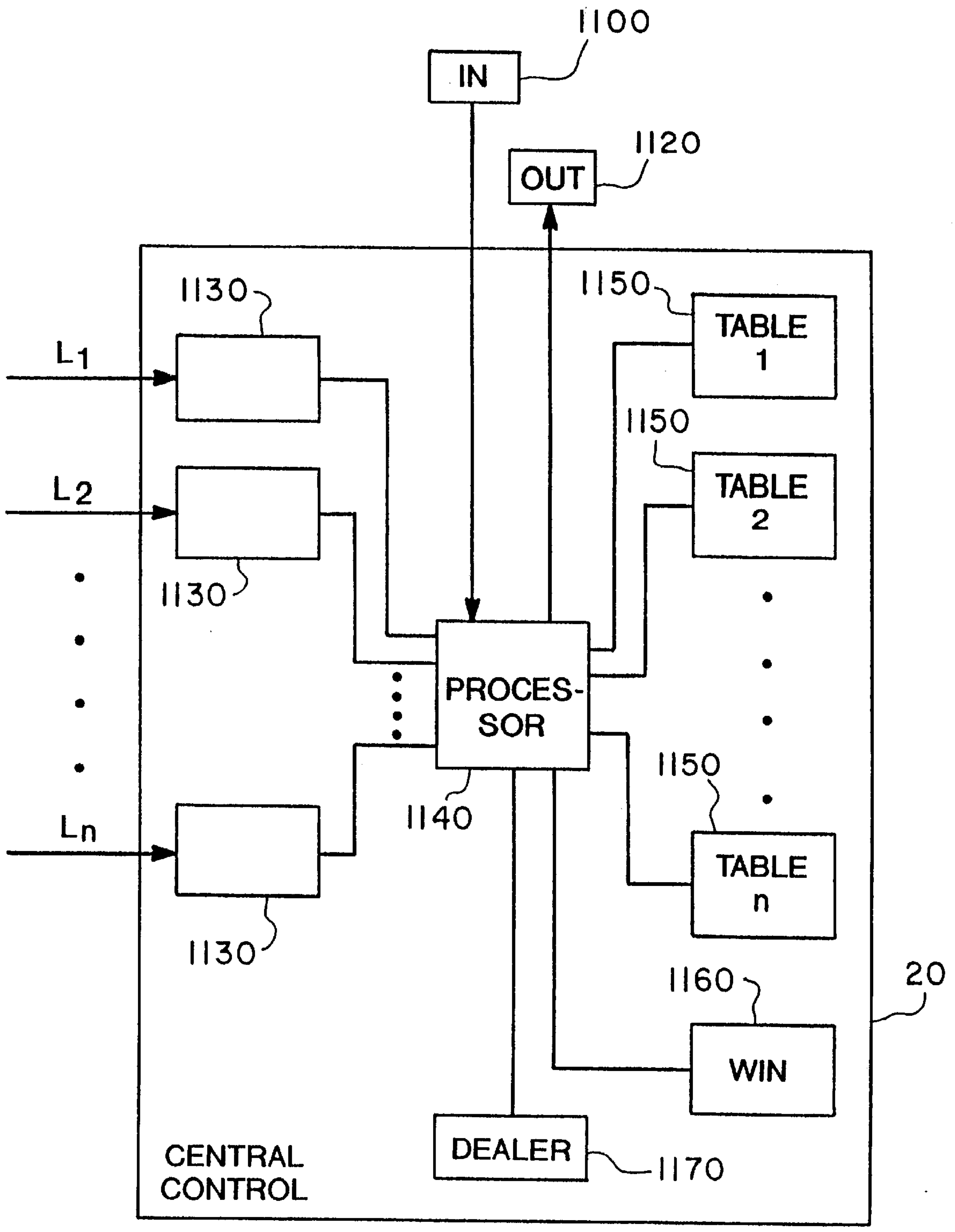
FIG. 11 is a block diagram setting forth the components of the central control, FIG. 12 sets forth the addition of an optical reader to the shoe of an automatic shuffler, set forth in U.S. Pat. No. 5,356,154

In FIG. 11, the detail of the central control 20 are set forth. The central control 20 is a conventional micro-processor system with conventionally available inputs 1100 such as a keyboard, a mouse, etc. and conventional outputs 1120 such as a printer. Any conventional configuration for a microprocessor system can be utilized for the central control 20. The central control 20 is interconnected over the communication links L1 through Ln as shown in FIG. 1. Each link engages a communication port 1130 such as a modem. It is connected to a central processor 1140. The processor is interconnected to memory 1150 and 1160. The history of each hand for each table is stored in memory 1150 including player positions being played, the actual contents of each hand dealt and each hand existing at each position, the game bets, the progressive bets, etc. The memory 1160 sets forth a complete record of players who have won the progressive bets.

It is to be understood that the memory 1150 and 1160 can be of any suitable configuration and arrangement and may be a relational data base. For example, information on each dealer can be keyed in at each game control GC so that dealer information, time of the game, or any other suitable management information can be delivered over the communication link L into memory 1150. Hence, should a dealer go from table to table and the memory 1150 is, for example relational, the processor 1140 can quickly ascertain a dealer history and store it for example in a separate dealer memory 1170 if desired. It is to be understood that each gaming control GC also has an input output circuit like circuits 1100 and 1120 which are not shown in the drawing.

7. Integrated Shuffler/Shoe

In FIGS. 12 through 14 modifications to the conventional, prior art automatic shuffler of U.S. Pat. No. 5,356,154 are set forth.

In FIG. 12, the shoe 250 is integrated into shuffler 240 and has a dispensing region 1210 with opposing ridges 1220 on either side thereof. A card 1230A is moved into position as shown by lines 1230B in the dispenser 1210. In the preferred operation, the dealer takes his finger and places it in area 1202 and pulls card 1230A in the direction of arrow 1232. This moves the card into the position of 1230B and places the card 1230B over a formed opening 1240. Centrally disposed in this opening is a lens 1250. Integrating the shoe into the shuffler into one unit enhances the security of the system, since the transfer of the cards to the shoe cannot be tampered with.

This is better shown in FIG. 13 wherein the shoe 250 is mounted to the game table 200. The lens 1250 is positioned through the game table 200 to capture an image from the face of the card 1230B as it is being dealt out of the shoe 250 by the dealer. The lens 1250 is connected to a conventional video camera 1260 and delivers optical images, in digital form, over lines 252 to the game control GC as shown in FIG. 2. The camera 1260 and the lens 1250 can be mounted in any fashion conventional housing 1270. The location of the lens 1250 is immaterial as long as an image is captured.

In this fashion, each card 1230 as it is pulled down into the dispenser of the shoe has an optical image taken as the card slides by. The image is taken as soon as the card leaves the shuffler 240. This reduces the risk that a card could be removed from the deck before an optical image is taken. It is to be expressly understood that the lens 1250 and the camera 1260 could be a suitable code reader such as a bar code reader or infrared code reader. In which case, the formed opening 1240 and the reader would be suitably located to take a reading. It is also to be understood that such a code reader could be used in conjunction with the taking of the optical images. Cameras and readers are presently small in size and can be suitably arranged to obtain both images and code readings (i.e., for deck identity).

The game control GC obtains a separate image for each card since as the card 1230B is removed from the shoe 250, the lens 1250, in its field of view 1280, receives a background ambient light reading until the next card 1230A is moved into position 1230B. In this fashion, the game control GC not only takes an optical image (or reads a code), but a count of the cards is also taken.

The rear of the automatic shuffler, set forth in U.S. Pat. No. 5,356,145, has a region which receives inserted cards after a hand is played. These cards, as taught in this patent, are stacked in an opening (labeled 5 in the '145 patent) and are shown as a stack (labeled 93 in the '145 patent) of cards for insertion. This is shown in FIG. 4 of the '145 patent. In the following discussion, the use of the "a" after the numeral indicates that the numeral has a corresponding reference in the '145 patent. Hence, **93*a*** refers to numeral 93 in FIG. 4 of the '145 patent.

As shown in FIG. 14, a drive disk **37*a* is connected over a shaft to a drive motor 38*a*. The shaft 1400 as shown in FIG. 14 is operably connected to the drive motor 38*a* and the drive disk 37*a* and is connected between side walls 30*a* of the shuffler. As taught by the '145 patent, the bottom card 1410 in the stack of cards 93*a* is selectively picked by the drive disk 1400 and moved out of the stack 93*a* and is delivered internally to the shuffler as taught in the '145 patent to stack 16*a***.

This shuffler is modified, as shown in FIG. 14, to provide a lens 1420 having a field of view 1415 near the disk **37*a* to read part of the face of the card either including the code 310 or obtaining an optical image from a portion of the face of the card 1410. The lens 1420 is connected to a camera 1430. The camera 1430 is in a housing 1440 which is connected to the bottom of the table 200 with the lens projecting upwardly through the table 200 into the automatic shuffler 240. In this fashion, each card 1410 as it is delivered from the stack 93*a* has an optical image taken or a reader reading the code 310. This information is delivered over lines 248** to the game control GC.

As illustrated in FIG. 15, which is a side illustration corresponding to that of FIG. 4 of the '145 patent, the field of view 1415 of the lens 1420 may be slightly offset to capture a region 1450. This region 1450 is partially off of the card 1410A.

In order to capture an image, a conventional light 1460 may be provided in the interior of the shuffler to provide illumination of the face of the card 1410A. Some conventional video cameras 1430 are sensitive enough to obtain an image without the provision of light 1460.

The disk turning in the direction of arrow 1470 causes the card 1410A to move toward an internal stack 16A as illustrated by card 1410B. This is conventionally taught by the '145 patent. Between each card transfer from stack **93*a* to stack 16*a*** there will be a short period of time in region 1450 in the field of view 1415 of the lens 1420 which provides a background ambient light signal so as to provide a separation or count of the cards.

It is to be expressly understood that any of a number of equivalent design approaches could be utilized to provide the timing necessary to capture an image of each individual card 1410A in the stack 93A. It is also to be expressly understood that the optical image taken by the cameras under the shuffler of the present invention may be limited to the region existing in the upper-left and lower-right corners of a card. For example and as illustrated in FIG. 3, a 3 of Diamonds in such comers contains the value=the number 3 and the suit=the diamond shape in region 320. The count can also be determined by counting the different optical images obtained without providing a background ambient light reading such as provided by area 1450.

The optional embodiment shown in FIGS. 12 through 15 provide a secure automatic card shuffler and a secure hand. In the internal environment of the shuffler 240, the game control by sensing the images coming from the shoe provides an accurate count and card identity verification. Likewise, all cards dealt in a hand from the shoe as the hand is played by the dealer and each of the players must come back into the shuffler to be counted and to be properly identified. In each of the three Examples of hands set forth above, the integrated automatic shuffler/shoe of the present invention provides an optical image of each card dealt to the game control GC which stores (stage 640 in FIG. 6) this in memory and/or delivers it to the central control CC (stages 910 and 1010 in FIGS. 9 and 10). Likewise, after a hand is played, each card upon insertion is read and the image delivered to the game control GC and the identity and count is verified (stages 688 and 692 in FIG. 6) and/or delivered to the central control. This prevents any cards from being added or subtracted from the hand. Any added or subtracted cards will be immediately detected and an alarm 694 or 690 raised. However, if a marked card of the same suit and value from another deck is substituted this will not be detected unless the card identity code is provide as discussed above. Although this is an optional feature of the secure live card progressive jackpot system of the present invention, it is an important feature to provide a secure game.

Figure 16:
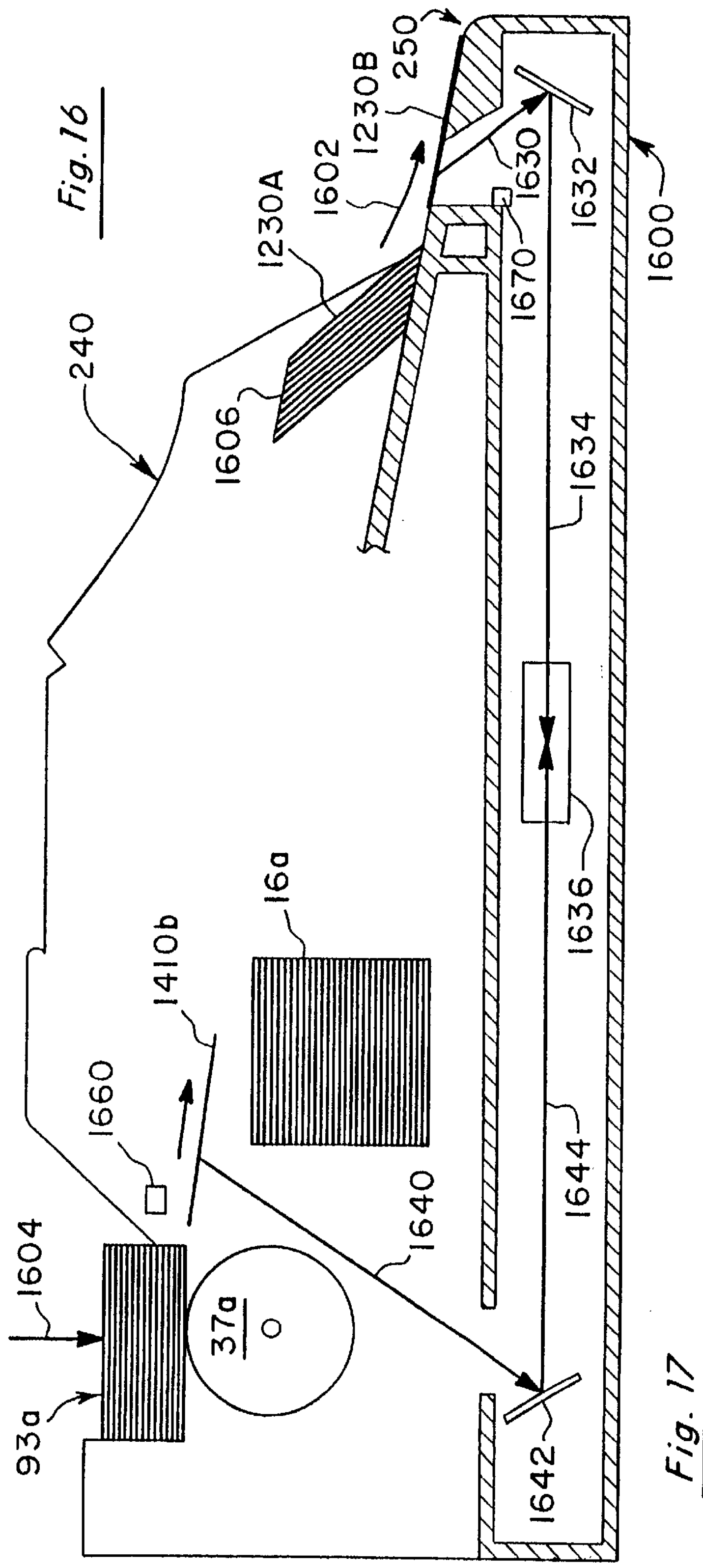
FIG. 16 is an illustration setting forth the addition of a single reader to the automatic shuffler of U.S. Pat. No. 5,356,154.
Figure 17:
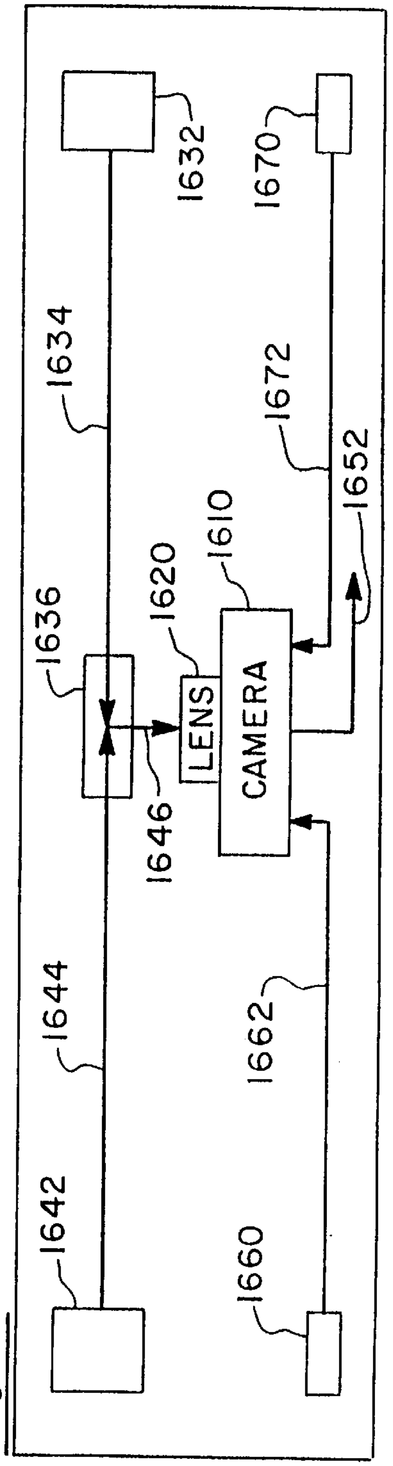
FIG. 17 is a top view illustration of the addition of FIG. 16.

In FIGS. 16 and 17 is set forth another embodiment of the secure shuffler of the present invention. Again, this shuffler is based upon that set forth in U.S. Pat. No. 5,356,145. The shuffler 240 is mounted on a base 1600 in which is contained a camera 1610 with a lens 1620. Hence, this embodiment is self-contained and is not mounted to the table.

In this embodiment, a single camera is used to record optical images of the cards dealt (as indicated by arrow 1602) and cards inserted (as indicated by arrow 1604). The inserted cards are placed in stack 93*a* and the cards dealt are dealt from stack 1230.

Hence, in FIG. 16, a card 1230B is placed in the modified shoe 250 and an image is delivered as shown by arrow 1630 into a mirror 1632 and is reflected 1634 into a central mirror 1636. Likewise, card 1410B is in stack 93*a* or is delivered into stack 16*a*, by drive disk 37*a*, an image 1640 is delivered into mirror 1642 and is reflected 1644 into the central mirror 1636. The lens 1620 receives the reflected signals 1646 from mirror 1636 and delivers these optical images over lines 252 to the game control. It is to be expressly understood that images 1630 and 1640 can be obtained from a number of regions internal to shuffler 240 and that mirrors other than mirrors 1632, 1646 and 1642, can be used to reflect images into lens 1620.

Sensors 1660 and 1670 can be provided to sense the presence of a card being optically imaged. Hence, sensor 1660 senses (such as optically) the delivery of a card 1410B which delivers a signal over lines 1662 to the camera 1610 thereby indicating to the camera 1610 the image source it is recording. Hence when signals are detected by sensor 1660 and delivered over line 1662 to the camera 1610, the camera is recording optical images of inserted cards 93*a*. When the sensor 1670 detects the presence of a card 1230B to be dealt, a signal is generated over line 1672 to the camera 1610 thereby indicating to the camera 1610 that optical images of cards to be dealt 1230A are being recorded by the camera 1610.

Hence, in this embodiment, a single camera system can be utilized through interaction with mirrors to record the optical image.

The present invention has been illustrated with the live card game of Black Jack. However, it is to be expressly understood that any casino live card game (such as the many varieties of poker games) may be secured herein in a multi-site progressive jackpot environment. The invention has been described with reference to the preferred embodiment. Modifications and alterations will occur to others upon a reading and understanding of this specification. It is intended to include all such modifications and alterations insofar as they come within the scope of the appended claims or the equivalents thereof.

I claim:

1. A method for operating a secure game table at which a live card game is played with at least one deck of cards in a shoe, said method including the steps of:

obtaining an optical image of each of a predetermined number of unique rank and value cards in said at least one deck as it is dealt from the shoe, identifying the value and suit of each card dealt by its optical image during the play of the live card game, issuing an alarm signal when an obtained optical image of other than the unique rank and value cards is identified.

2. The method of claim 1 further comprising:

the step of counting all cards in response to shuffling of the cards in the shoe, issuing an alarm signal when the count of cards is different from the predetermined number of cards in the at least one deck of cards in said live card game.

3. The method of claim 1 wherein each different deck has a different common identity code on each card therein.

4. The method of claim 3 wherein the common identity code is invisibly placed on a card.

5. The method of claim 4 wherein the invisible code is an infrared code.

6. A method for operating a secure game table at which a live card game is played with at least one deck of cards in a shoe, said method including the steps of:

obtaining an optical image of each of a predetermined number of unique rank and value cards in said at least one deck as it is dealt from the shoe, identifying the value and suit of each card dealt by its optical image during the play of the live card game, issuing a first alarm signal when an obtained optical image of other than the unique rank and value cards is identified, the step of counting all cards in response to shuffling of the cards in the shoe, and issuing a second alarm signal when the count of cards is different from the predetermined number of cards in the at least one deck of cards in said live card game.

7. A method for operating a secure game table at which a live card game is played with a plurality of decks of cards, said method including the steps of:

providing a common identity code located on each of a predetermined number of cards in said at least one deck wherein each card in each different deck has a common identity code corresponding to its deck, detecting during the play of the live card game the common identity code on each card, issuing a first alarm signal when a card not having a common identity code is sensed, the step of counting all cards in response to shuffling of the cards, issuing a second alarm signal when the count of cards is different from the predetermined number of cards in said live card game.

8. The method of claim 7 wherein the common identity code further includes the value of a card and the suit of a card.

9. The method of claim 7 wherein the image of each card is optically scanned.

10. The method of claim 7 wherein the common identity code is invisibly placed on a card.

11. The method of claim 10 further comprising the step of reading the invisible common identity code with an infrared reader.

12. A method of card delivery for a card game including the steps of:

dispensing cards to a number of players and to the dealer;

scanning each of the cards dispensed from a shoe;

generating identity data representative of the identity of each card dispensed to the players and to the dealer;

storing the identity data of each scanned card for each hand played by the number of players and by the dealer during the card game;

storing for each card game dealer information;

storing for each card game the time of the card game;

storing for each card game the identity of the table in which the card game was played; and storing for each card game whether the dealer wins or loses.

13. A method of card delivery for a card game comprising the steps of:

dispensing cards in the card game from a shoe;

automatically counting each of the cards as they are dispensed from the shoe;

playing the card game with the dispensed cards;

retrieving the cards after the game is played;

automatically counting the retrieved cards in the shoe;

sounding an alarm when the count of the cards dispensed does not equal the count of the cards retrieved.

* * * * *